(12) United States Patent
Wüstefeld

(10) Patent No.: US 7,995,192 B2
(45) Date of Patent: Aug. 9, 2011

(54) SAFETY SYSTEM FOR CONTACTLESS MEASUREMENT OF PATHS AND/OR SPEEDS

(75) Inventor: Martin Wüstefeld, Sexau (DE)

(73) Assignee: Sick AG, Waldkirch (DE)

( * ) Notice: Subject to any disclaimer, the term of this patent is extended or adjusted under 35 U.S.C. 154(b) by 271 days.

(21) Appl. No.: 12/318,382

(22) Filed: Dec. 29, 2008

(65) Prior Publication Data

US 2009/0190120 A1  Jul. 30, 2009

(30) Foreign Application Priority Data

Jan. 28, 2008 (EP) .................................... 08101007

(51) Int. Cl.
*G01P 3/36* (2006.01)

(52) U.S. Cl. .......... 356/27; 356/28; 340/679; 340/693.5

(58) Field of Classification Search .............. 356/27–28, 356/5.01; 250/206.1, 221, 206.2; 340/679, 340/680, 686.6, 552, 557
See application file for complete search history.

(56) References Cited

U.S. PATENT DOCUMENTS

| | | | | |
|---|---|---|---|---|
| 3,885,873 A * | 5/1975 | Andermo | .................... | 356/28 |
| 4,495,589 A * | 1/1985 | Hirzel | ..................... | 702/144 |
| 5,568,406 A * | 10/1996 | Gerber | ..................... | 702/159 |
| 6,023,335 A * | 2/2000 | Wustefeld | ................ | 356/388 |
| 6,297,844 B1 | 10/2001 | Schatz et al. | | |
| 6,452,535 B1 * | 9/2002 | Rao et al. | ................... | 342/72 |
| 6,778,092 B2 * | 8/2004 | Braune | .................... | 340/679 |
| 6,844,537 B2 * | 1/2005 | Wilson et al. | ............... | 250/206.1 |
| 6,859,145 B2 * | 2/2005 | Wilker et al. | ................ | 340/693.5 |
| 6,860,350 B2 * | 3/2005 | Beuhler et al. | ................ | 180/167 |
| 7,116,799 B2 * | 10/2006 | Wustefeld et al. | ............ | 382/103 |
| 7,242,462 B2 * | 7/2007 | Huang | ..................... | 356/27 |
| 2004/0114381 A1 * | 6/2004 | Salmeen et al. | .............. | 362/465 |

FOREIGN PATENT DOCUMENTS

| | | |
|---|---|---|
| DE | 102 26 950 A1 | 4/2003 |
| DE | 102 45 720 A1 | 4/2004 |
| EP | 1 837 586 A2 | 9/2007 |

* cited by examiner

*Primary Examiner* — Sang Nguyen
(74) *Attorney, Agent, or Firm* — The Nath Law Group; Derek Richmond; Robert T. Burns

(57) ABSTRACT

An optoelectronic safety sensor (10) is set forth for the contactless measurement of paths and/or speeds of the safety sensor (10) or of a first object connected in a fixed position to the safety sensor (10) with respect to a second object (12) moved relatively to the first object, which form a potential source of danger, wherein the safety sensor (10) has a light source (20), a light receiver (16) with a plurality of light reception elements and has an evaluation unit (22), with the evaluation unit (22) being configured to determine by means of an optical correlation process and/or by evaluation of the optical flow the path and/or the speed from at least two images of a surface structure (18, 18a, 18b) of the second object (12) taken sequentially by the light receiver (22). In this respect, the evaluation unit (22) is further configured to evaluate the quality of the determined path and/or of the determined speed, and a safety output (24) is provided via which the evaluation signal (22) can output a shutdown signal or brake signal to secure the danger source when a required quality is not reached.

18 Claims, 2 Drawing Sheets

Figure 1:
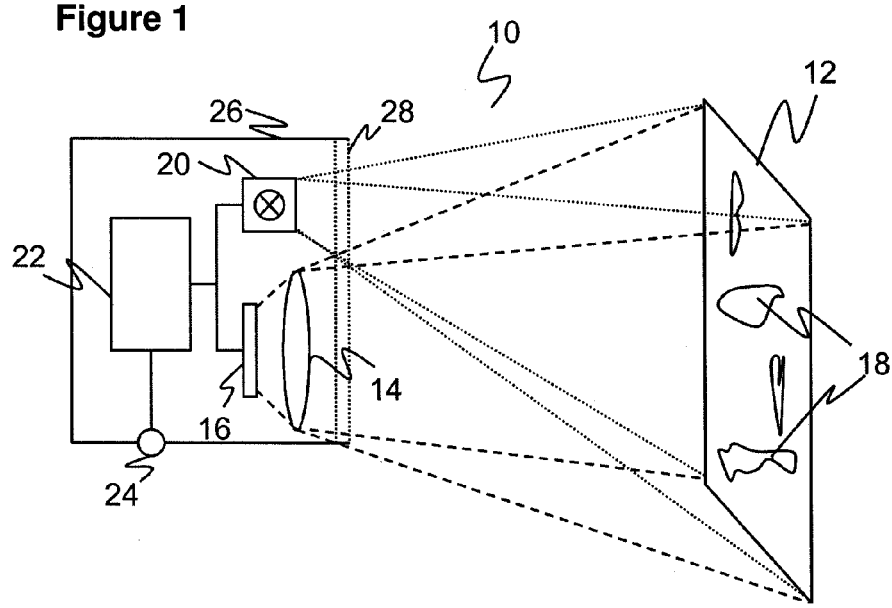

Figure 3
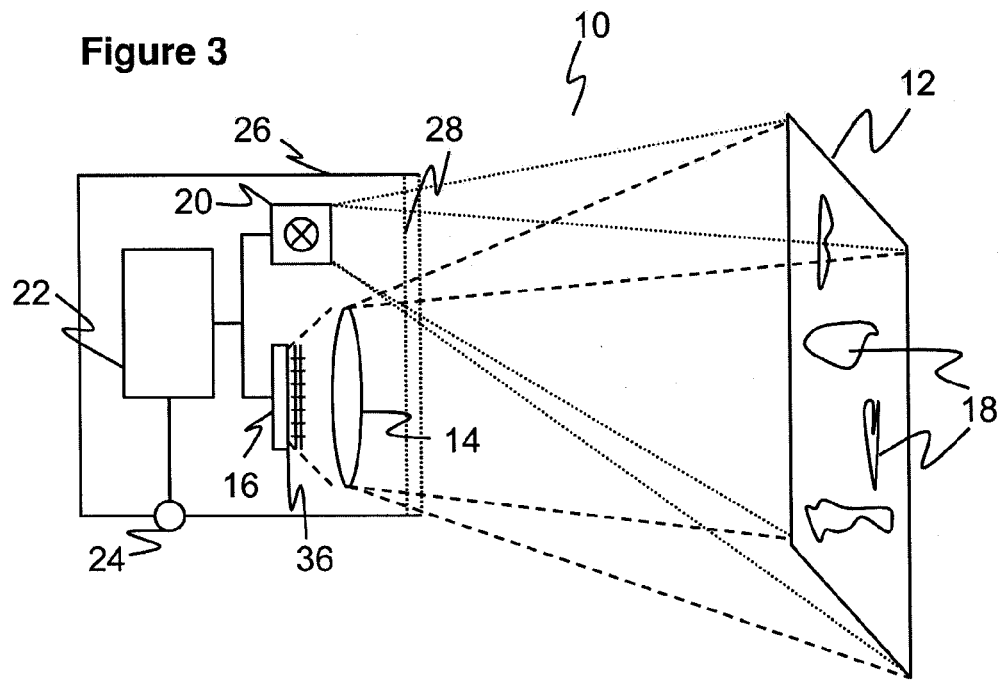
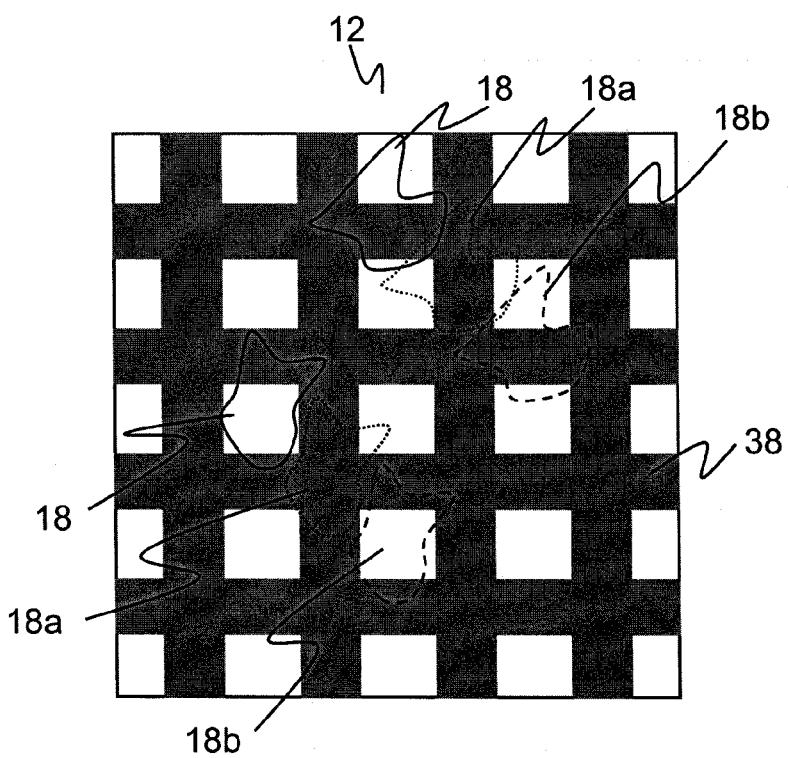
Figure 4

SAFETY SYSTEM FOR CONTACTLESS MEASUREMENT OF PATHS AND/OR SPEEDS

The claimed subject matter relates to an optoelectronic safety sensor and to a safety method for the optical contactless measurement of paths and/or speeds in accordance with the exemplary embodiments disclosed herein.

Various optoelectronic sensors working in a contactless manner have been established in safety technology to protect operators from accidents at the machines operated by them or from other sources of danger in their environment. None of these safe optoelectronic sensors such as light gratings; light barriers or scanners are able to determine the path or the speed of an object directly. Known methods for the determination of the path or speed do not satisfy the desired defined safety categories for technical safety applications. If a safe signal is required for speed determination or for the recording of the path, this is done via indirect methods, for example via rotary encoders which determine the speeds on the input shaft.

In a conventional method for the contactless optical measurement of paths and speeds by means of optical correlation, the surface of a reference object is taken using a pixel-resolved light receiver, with a relative movement being measured with respect to said reference object. A grating is disposed in front of the light receiver and acts as a spatial frequency filter. Structures of the surface in different shots of the light receiver can be recognized with its help and paths and speeds can be calculated from their displacement. Such methods are described in DE 44 09 241 C2, in DE 4444 223 C5 or in EP 1 047 918 B1. It is also known to correlate a plurality of shots of the light receiver with one another without an interposed grating. A further alternative for the evaluation is based on the estimate of the optical flow whose variation in time includes a component which is determined by relative movements and therefore enables conclusions on the path and speed. However, none of these methods is per se reliable enough to be used in safety technology.

Today's safe sensors such as horizontally disposed light gratings or scanners which are oriented on reference points or reference areas and thus make high and flexible demands on the installation can determine a path or a speed only by downstream signal processing and within a restricted range despite this effort. Indirect methods, for instance via rotary encoders, always carry the risk that the actually traveled path is not determined and consequently a false speed is determined. The reason can be slip or mechanical damage in the further drive components, for instance incorrect assumptions on the tire diameter due to varying tire pressure.

It is admittedly generally possible to determine the path and speed of an object by complex and/or expensive image processing using 3D monitoring cameras such as are known, for instance, from U.S. Pat. No. 6,297,844 B1. Provided the recognition of the object via its trajectory is successful at all, these evaluations cannot yet be achieved reliably using today's technology and would endanger the life and health of operators. In another respect, the apparatus effort for a 3D camera and its complex and/or expensive evaluation units is much too high for a safety sensor suitable for practice which should only determine the path and the speed.

It is therefore the object of the invention to provide a system for the contactless measurement of paths and/or speeds for safety technology.

This object is satisfied by a safety sensor in accordance with the exemplary embodiments disclosed herein. In this respect, the claimed subject matter starts from the principle of continuously checking the light reception data for an optical correlation or for the estimate of the optical flow and to recognize immediately independently if no reliable path determination or speed determination is possible. If this is the case, shutdown takes place immediately with a view to safety. The term "shutdown" is to be understood here and in the following in a wide sense and means that the source of danger is secured. This can be achieved in many cases by shutting down; however, other safety measures are also conceivable such as the pivoting in of a mechanical safeguard or the braking of a vehicle or of a dangerous machine part.

The invention has the advantage that direct, and thus slip-free, path measurements and speed measurements are made possible in safety technology. A flexible, cost-favorable sensor arises by the optical measurement methods used in accordance with the invention which covers a whole series of technical safety applications which could previously not be satisfied at all optically or only with a disproportionately high effort and/or cost.

The determination of the speed from the determined path is possible via a common time base. The determined path corresponds to the movement carried out. The terms path, speed and movement are therefore used as synonyms at some passages. The sensor can, but does not have to be able to deliver and to output both a path signal and a speed signal.

In an advantageous further development, the evaluation unit is configured to check the imaging of the second object for sufficient structure in the evaluation of the quality, in particular whether a sufficient spatial change in intensity over the plurality of light reception elements is present. Without a sufficient optical surface structure of the second object, the sensor could not reliably distinguish whether it is stationary or is moving with respect to the then smooth surface. The missing surface structure could also be based on the sensor looking into space, being incorrectly focused or on the lighting having failed. A whole series of error situations are thus taken into account by the evaluation of the surface structure in which operators are protected by the immediate safety directed reaction.

In this respect, the evaluation unit is particularly preferably configured to calculate a reliability measure for sufficient structure which takes account of the number of extremes of intensity, the distinctiveness of the extremes and/or the scattering of the spatial location and distribution of the extremes. The minima and maxima of the intensity distribution are created by optical structures of the surface of the second object. If extremes are therefore not present or are not present in sufficient number, no safe path determination is possible. The same applies if these extremes have to weak a distinctiveness, which can relate both to their spatial extent and their amplitude and is determined for instance, by a threshold evaluation. Finally, the spatial distribution of the extremes can also provide a conclusion on the quality of the surface structure. If they are too close to one another, for instance, the structure could be not distinctive enough, not representative or its correlation could be too weak for a reliable recognition in later images. These measures all have in common that they can be evaluated very fast and simply. Further evaluations of the intensity modulation known from mathematics are furthermore naturally also conceivable.

The evaluation unit is advantageously configured to define a maximum time interval within which the quality or part criteria of the quality can be evaluated as insufficient without outputting a shutdown signal or a brake signal. This time interval above all depends on the required response time set by the safety category. Since a deficient quality is still tolerated for the largest possible time period not endangering operators, downtimes and complex and/or expensive phases of switching back on are avoided as much as possible.

An optical element is preferably connected before the light receiver and forces a regular base structure onto the image, in particular an optical grating, and/or the evaluation unit or the light receiver is configured to generate the regular base structure virtually by reduction and/or increase of the brightness signal of selected light reception elements and/or the evaluation unit is configured to take account of the regular base structure as a reference signal in the evaluation of the structure of the second object. A special optical evaluation process is made possible by such a grating, namely a spatial frequency filter process which facilitates the optical correlation. Instead of the grating, which represents an additional element, the optical change caused by a grating can also be calculated and imposed on the signal electronically. If, finally, the evaluation unit is capable of adding out the diffraction pattern, evaluations can be carried out which correspond to a situation without a grating despite the grating.

In a preferred further development, the safety output is made with two channels and/or at least one second redundant evaluation unit is provided and/or a plurality of evaluation processes, in particular different evaluation processes, are implemented in the evaluation unit or units for the determination of the quality, of the path and/or of the speed. Such measures increase the safety of the sensor. If in particular different evaluations are implemented, for instance an optical correlation, on the one hand, and an estimate of the optical flow, on the other hand, even systematic errors of an individual evaluation process do not result in danger for the operators since the shutdown directed to safety takes place on a lack of agreement of the determined path or of the speed of only one evaluation unit or of only one evaluation process.

The second object advantageously has an intensified optical structure, in particular due to coarse-grain coating, different-color pigments and/or patterns. This is naturally only sensible if the sensor is used in a defined environment. Situations in which the sensor cannot determine any path or any speed due to too weak a received signal and therefore does not output a shutdown signal can be avoided, or at least reduced in frequency, by intensification of the optical structure. The availability is thereby substantially increased.

In an advantageous further development, the evaluation unit is configured to calculate an absolute position of the first object and/or of the second object from the path and/or speed by means of a starting reference and/or to monitor the speed and/or absolute position of the first object and/or second object and to output the shutdown or brake signal when specific absolute positions are reached or specific speeds are exceeded or specific speeds are exceeded at specific absolute positions. The sensor makes it possible in this manner to determine reliable absolute positions, whereby a series of technical safety applications are opened. It is thereby inter alia made possible to avoid specific regions completely in which a risk situation could arise. It is furthermore also possible to define speed limits, in particular also in dependence on the absolute position. There can thus be regions on a factory work floor where the first object can move more or less freely so that no speed limits or only very high speed limits have to be imposed on it, whereas in other regions the exceeding of a substantially lower speed is already to be considered a risk. The working speed can be increased by such flexible restrictions without thereby reducing safety.

In various advantageous applications, the safety sensor can be stationary and the second object can be part of a machine tool, of a conveyor belt or of a robot or the safety sensor is mobile and the first object is a vehicle, an elevator or a robot and the second object is part of a floor, of a wall, of a work surface or of a rail. The paths and speeds measured relatively between the first object and the second object can in this respect naturally be converted to a reference system with a known speed with respect to one of the two objects. It is therefore possible in accordance with the invention both to determine the path and/or speed of an object provided with the sensor with respect to the environment and to direct the sensor to an object moved with respect to the environment and to determine its path and/or speed.

The safety output can preferably act on the danger source directly or indirectly via a higher ranking connected safety control. This depends on the application, for example whether the sensor is attached on its own to a vehicle in a mobile manner or is integrated into a complex control on a factory work floor. The invention can be used in both cases.

In a preferred further development, a safe navigation is made possible in that a further sensor is provided which is in particular of the same construction as the first sensor (10) or is a laser scanner. Safe navigation is a desired safety application which is, however, not provided by conventional optical sensors since, for instance, a laser scanner alone cannot generate the required position signals frequently enough.

The method in accordance with the invention can be further developed in a similar manner and shows similar advantages. Such advantageous features are described in an exemplary, but not exclusive manner in the dependent claims following the independent claims.

Figure 2A:
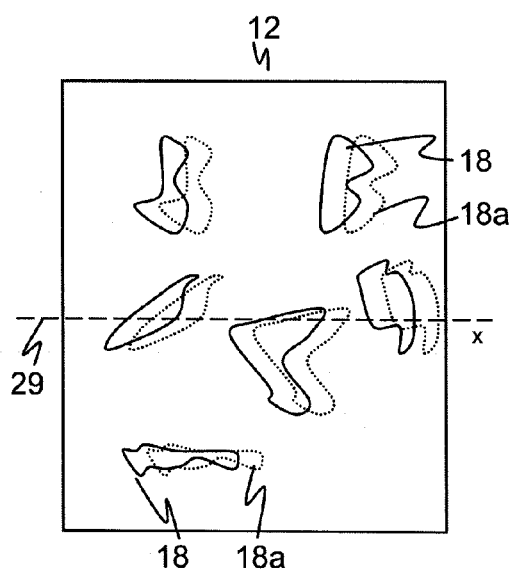
Figure 2B:
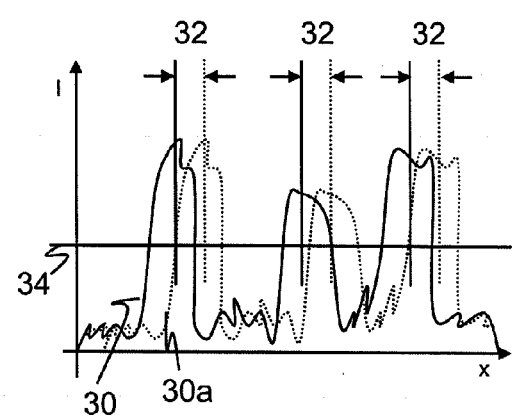

The claimed subject matter will also be explained in more detail in the following with respect to further features and advantages by way of example with reference to embodiments and to the enclosed drawing. The Figures of the drawing show in:

FIG. 1 a schematic representation of a first embodiment of the safety sensor in accordance with the invention and of the surface of a second object taken by it for the path determination;

FIG. 2*a* a schematic front view of the surface of the second object in accordance with FIG. 1 for the explanation of the optical evaluation process;

FIG. 2*b* an exemplary projection of the intensity distribution at the surface of the second object in the X direction;

FIG. 3 a schematic representation of a second embodiment of the safety sensor in accordance with the invention with an additional diffraction grating and of the surface of a second object taken by it for the path determination; and FIG. 4 a schematic front view of the surface of the second object in accordance with FIG. 3 for the explanation of the spatial frequency filter process.

FIG. 1 shows a schematic representation of a first embodiment of a safety sensor 10 in accordance with the invention. The light from a reference object 12 is incident via an optical imaging system 14, a lens or a lens system, for example, on a light receiver 16.

Instead of the lens, a prism or a prism arrangement which supports the in particular FFT (Fast Fourier Transformation) based evaluation can be used as the optical imaging system 14. This light receiver is able to generate a spatially resolved image of the surface of the reference object 12 and in particular of surface structures 18 on the reference object 12. An array-shaped or matrix-shaped CCD chip or CMOS chip with a plurality of pixels or light reception elements, but also an arrangement or array of photodiodes, can be used for this purpose.

The reference object 12 is illuminated by an active light source 20. This light source 20 can be a customary light bulb or a halogen lamp; but in practice will preferably be a semiconductor light source, that is one or a plurality of LEDs or laser diodes, due to the construction size and the luminous intensity.

A control and evaluation unit 22 is connected to the light source 20 and the light receiver 16. It receives light signals of the light receiver 16 and controls the illumination of the reference object 12 via switching on and off the light source 20 as well as its power consumption. The method described further below is also implemented in the evaluation unit 22 for the determination of the path signals or speed signals.

The evaluation unit 22 can output a shutdown signal via a shutdown output 24. This shutdown signal either acts directly on a danger source (as an OSSD), that is it switches off a connected machine or it changes it to a safe state. Alternatively, the shutdown signal is forwarded to a higher ranking safety control, not shown, which in turn secures the danger source.

The safety sensor 10 is accommodated in a housing 26 with a front screen 28. It is also conceivable to provide the evaluation unit 22 or light source 20 in one or more separate housings. The evaluation unit 22 could also be implemented fully or partly in the higher ranking safety control.

FIG. 2a shows an exemplary schematic front view of the surface of the reference object 12 as also corresponds to the signals of the light receiver 16 to be evaluated. In this respect, structural features 18 are shown by solid lines and the same structural features 18a at a late time by dashed lines. The structural features 18 have therefore been displaced by a relative movement of the safety sensor 10 with respect to the reference object 12. The path the safety sensor 10 travels with respect to the reference object 12 can be calculated from this displacement and the speed can also be calculated with the help of a time base. The spacing between the safety sensor 10 and the reference object 12 can also be preset or measured for absolute indications.

The structural features 18 are naturally present optical irregularities, for instance the natural texture of the base or of a wall. A natural roughness can be optically amplified by an inclined installation of the safety sensor 10 or by an inclined illumination by the light source 16. It is also conceivable in an alternative embodiment to amplify the structural features 18 directly in that the reference object 12 is provided with a coarse-grain coat, color features or a pattern, also a coding or a barcode. The existing finer structure can also be utilized better by use of an optical system 14 with a high resolution and thus speeds of 4 m/s and more can be measured.

FIG. 2b illustrates the intensity distribution I for a projection in the X direction along the dashed line 29 of FIG. 2a. In this respect, the solid function 30 corresponds to the intensity imprinted by structural features 18 at one point in time, whereas the dashed function 30a corresponds to the intensity imprinted by structural features 18a at a later point in time. The relative movement in the X direction corresponds to the offset 32 of the two functions 30, 30a with respect to one another. The evaluation is naturally not restricted to the X direction, it rather only serves for the simplified representation; the intensity can rather be evaluated as a full two-dimensional function.

To determine the offset of the structural features 18 with respect to the structural features 18a, optical correlation processes or image correlation processes are implemented in the evaluation unit 22. The structural features 18 are therefore tracked in the two different images taken at different times and are identified in the later image with the structural features 18a. The evaluation unit 22 can determine the movement in the X and Y directions with reference to the known pixel size of the light receiver 16. Suitable mathematical methods for the determination of the correlation are generally known, for example a cross-correlation or methods based on Fourier analysis. Another possibility is to estimate the optical flow from a plurality of images which includes a substantial component of time dependence generated by the relative movement, in addition to variations due to changing ambient light, changed reflection angles, shadowing and similar interference effects.

For technical safety applications, the evaluation unit 22 does not only determine the offset in the described manner, and from this the path and the speed, but simultaneously evaluates how accurate this evaluation is. If this evaluation does not satisfy preset safety demands, a shutdown signal is output via the shutdown output 24 to preclude dangers which arise due to the insufficiently known relative movement. Such a shutdown also takes place when the quality of the evaluation is considered sufficient, but the path signal or speed signal indicates that an object connected to the safety sensor 10 or the reference object 12 infringes a protected region or has too high a speed, just as in the case of a short-circuit or a different fault. The limit speeds can depend on an absolute position which can be provided constantly via a start reference from the path signal and they can be preset for the evaluation unit 22 by a user via operating elements at the safety sensor 10 or by computer or the like via a data interface.

Most of the described mathematical evaluation processes already provide a feasible portion for the evaluation or a measure of quality, for instance in the form of a correlation coefficient. An important further feature is whether the reference object 12 has sufficient structure at all, that is sufficiently strongly pronounced structural features 18. The structure can, as shown in FIG. 2b, be examined by a threshold evaluation of the intensity function using a threshold 34. Minima or maxima of the intensity function are identified in this manner. Different demands can now be made: sufficient extremes, that is recognizable structural features 18, must generally be present; the extremes and accordingly the structural features 18 must have a specific control, that is they must be representative; or the extent of the extremes must be checked with a more complex process than with a threshold alone to distinguish it from noise or interference effects.

The quality can take account of some or all of these and further factors with different weighting to decide whether the output path and speed signal was reliable and in particular whether sufficient structure of the reference object 12 can be resolved. A particular reason for a lack of structure can also be found in a malfunction, a failure or an incorrect adjustment or assembly of the light receiver 16. Since a shutdown optionally takes place in all of these cases, a risk to operators due to unreliable measured data can be reliably precluded. In this respect, depending on the required safety stage, the safety sensor 10 can tolerate some all or the shutdown criteria for a time duration of up to the response time at a maximum so that an unnecessary shutdown is avoided, for instance if the structure of the reference object 12 is only not sufficient for a brief period beneath the response time, but then sufficient structure is again immediately present.

So that the safety sensor 10 becomes even more reliable, the hardware, including the evaluation unit 22 and the shutdown output 24, can be made safe, in particular with two channels. With respect to the evaluation unit 22, it is conceivable both to provide a plurality of evaluation components which are the same, that is redundant, and to select different diverse hardware from the group of microprocessors, ASICs (Application Specific Integrated Circuits), FPGAs (Field Programmable Gateway Arrays), PLDs (Programmable Logic Devices), DSPs (Digital Signal Processors). Finally, a plurality of evaluation processes can be implemented in parallel, for example an optical correlation, on the one hand, and an evaluation of the optical flow, on the other hand. If discrepancies of the two evaluation processes arise which are too large, a shutdown takes place.

In addition to the shutdown signal through the shutdown outlet 24, the safety sensor can also be connected to further outputs via which not only the path signal and speed signal, but also other measured data, raw or preprocessed signals or images of the light receiver 16 or the evaluation of the quality together with all preprocessing stages are output, for instance for diagnostic purposes. These further outputs are also preferably designed as safe, in particular with two channels.

FIG. 3 shows a further embodiment of the safety sensor 10, with here, as everywhere in the descriptions, the same reference numerals designating the same features. This embodiment differs by a special implementation of the optical correlation in the evaluation unit 22 which is applied additionally or alternatively to the previously presented evaluation processes. An optical grating 36 is disposed in front of the light receiver 16 for the determination of the optical correlation by means of a spatial frequency process. Instead of a grating 36, other elements are also imaginable which imprint a base structure on the image of the reference object 12. It is furthermore conceivable not to imprint this base structure optically, but only in a calculatory manner on the signal of the light receiver 16 or on the image data in the evaluation unit 22. In this respect, the grating is therefore generated by the uniform pixel structure of the light receiver 16 and by a positive and negative weighting of the brightness of the individual pixels.

FIG. 4 schematically shows a front view of the surface of the reference object 12 as is taken by the light receiver 16 through the grating 36. In this respect, the base structure 36 of gray grating bars is shown in simplified form; in reality, a diffraction pattern could arise here. The moved image of the reference object 12 thus has a grating structure superimposed on it, whereby a periodic starting signal of the light receiver 16 is received whose frequency is in turn proportional to the speed. This immediately becomes understandable when structural features 18 shown by solid lines are tracked in time which are first displaced toward the positions 18a shown by dotted lines and at an even later time toward the positions 18b shown with dashed lines. The structures 18 are periodically covered by the grating pattern 38.

This can also be illustrated by a simple model completely independent of the safety sensor 10 shown: light/dark zones arise alternatingly under sunlight in a road with trees at the side of the road. Vehicles which move on this road reflect now more and now less light depending on whether they are just traveling through a sunlit section or a shade section. The faster they move, the shorter the intervals become in which they "are lit up" in sunlight.

If the spatial frequency filter process just described should be used for the diversification in addition to another of the optical correlation processes described further above or in addition to a model based on the optical flow, it is advantageous if the evaluation unit 22 is able to add out the base structure imprinted through the grating.

The safety sensor 10 can be used in a whole number of different applications. In some of these applications, the safety sensor 10 is stationary, that is it is installed, for example, on the floor, on a work surface or fixedly at a machine, and observes as the reference object 12 a region through which objects move whose speed should be reliably determined. This could also be an assembly line, a conveyor belt, a vehicle or a robot. It is conversely also conceivable that the safety sensor 10 is installed in mobile form at a vehicle, at a movable machine part, at a robot or at an elevator and its own movement is tracked as the path and speed with reference to the floor, a wall or other objects.

It is in particular conceivable with the mobile applications to preset an absolute position in the safety sensor 10 at the start and/or at regular intervals, with the safety sensor 10 tracking changes of its position with reference to the path signal. For support and for a further increase of safety, two safety sensors 10 of the same construction or one safety sensor 10 combined with a laser scanner, for example, can be used. An autonomous, safe navigation is possible in this manner.

The invention claimed is:

1. An optoelectronic safety sensor for the contactless measurement of paths and/or speeds of the safety sensor or of a first object connected in a fixed position to the safety sensor with respect to a second object moved relative to the first object wherein the objects form a potential source of danger on movement, the optoelectric safety sensor comprising:
a light source;
a light receiver having a plurality of light reception elements;
an evaluation unit configured to determine at least one of a path and a speed of a surface structure with respect to a second object, using at least one of an optical correlation process and an evaluation of an optical flow from at least two images of the surface structure taken sequentially by the light receiver, wherein:
the evaluation unit is further configured to evaluate a quality of the at least one determined path and determined speed; and
the evaluation unit is operably connected to a safety output via which the evaluation unit is configured to output a shutdown signal or brake signal when an evaluated quality falls below a predetermined threshold.

2. A safety sensor in accordance with claim 1, wherein the evaluation unit is configured to check an image of the second object for whether a sufficient spatial change of intensity is present over the plurality of light reception elements.

3. A safety sensor in accordance with claim 2, wherein the evaluation unit is configured to calculate a reliability measure for sufficient structure which takes account of at least one of a number of extremes of intensity, an extent of the extremes, a scattering of spatial position, and a distribution of the extremes.

4. A safety sensor in accordance with claim 1, wherein the evaluation unit is configured to define a maximum time interval within which the quality or part criteria of the quality can be evaluated as insufficient without outputting a shutdown signal or a brake signal.

5. A safety sensor in accordance with claim 1, wherein:
an optical element is connected before the light receiver and is configured to impose a regular base structure on the image;
at least one of the evaluation unit and the light receiver is configured to generate the regular base structure virtually by changing the brightness signal of selected light reception elements; and
the evaluation unit is configured to take account at least one of the regular and the virtual base structure as a reference signal in an evaluation of a structure of the second object.

6. A safety sensor in accordance with claim 1, wherein the safety output is selected from the group consisting of two channels, at least one redundant evaluation unit, and a plurality of evaluation units.

7. A safety sensor in accordance with claim 6, wherein the safety output is configured to evaluate the quality of the at least one determined path and determined speed.

8. A safety sensor in accordance with claim 1, wherein the second object has an amplified optical structure of differently colored pigments and/or patterns.

9. A safety sensor in accordance with claim 1, wherein the evaluation unit is configured:
   to calculate an absolute position of the safety sensor, of at least one of the first object and the second object from at least one of the path and speed of the at least one first and second object by means of a starting reference; and
   to monitor at least one of the speed and absolute position of the at least one first object and second object; and
   to output the shutdown or brake signal if at least one predetermined specific absolute position is reached or at least one predetermined specific speed is exceeded, or if at least one predetermined specific speed is exceeded at at least one predetermined specific absolute position.

10. A safety sensor in accordance with claim 1, wherein the safety sensor is stationary and the second object is part of a machine tool, a conveyor belt or a robot.

11. A safety sensor in accordance with claim 1, wherein the safety output acts on the danger source via a higher ranking connected safety control.

12. A safety sensor in accordance with claim 1, further comprising at least one of a second sensor of the same construction as the first sensor and a laser scanner.

13. A safety sensor in accordance with claim 1, wherein the safety sensor is mobile and the first object is a vehicle, an elevator or a robot and the second object is part of a floor, of a wall, of a work surface or of a rail.

14. A safety method for the optical contactless measurement of paths and/or speeds of a safety sensor or of a first object with respect to a second object moved relative to the first object wherein the objects form a potential source of danger on movement, the method comprising the steps of:
   illuminating the second object by a light source;
   imaging a surface structure of the second object on a light receiver having a plurality of light reception elements; and
   determining at least one of a path and a speed of the first object using at least one of an optical correlation process and an evaluation of an optical flow;
   evaluating a quality of the at least one determined path and determined speed; and
   outputting a shutdown signal or brake signal via a safety output when an evaluated quality falls below a predetermined threshold.

15. A safety method in accordance with claim 14, wherein the image of the second object is checked for whether a sufficient spatial intensity change is present over the plurality of light receivers.

16. A safety method in accordance with claim 15, wherein a reliability measure is determined for sufficient structure which takes account of at least one of extremes of intensity, control of spatial position, and distribution of extremes.

17. A safety method in accordance with claim 14, further comprising the steps of:
   imposing a regular base structure on the image by an optical grating connected before the light receiver;
   virtually generating the regular base structure by changing a brightness signal of selected light reception elements; and
   taking into account at least one of the virtually generated and the regular base structure as a reference signal in the evaluation of the structure of the second object.

18. A safety method in accordance with claim 14, wherein an absolute position of the at least one safety sensor, first object, and second object is determined on the basis of the at least one determined path and speed while taking account of at least one of a start position, an intermediate position, and a safe navigation of the first object and/or of the second object by means of two-fold determination of path and/or speed.

* * * * *